United States Patent [19]

Kuhlmann et al.

[11] Patent Number: 5,043,884
[45] Date of Patent: Aug. 27, 1991

[54] COMMUNICATIONS INSTALLATION WITH COMMUNICATIONS TERMINAL EQUIPMENT PROVIDED WITH PRESCRIBED FUNCTIONS DEFINED AND CONTROLLED BY A COMMUNICATIONS INSTALLATION WITH INFORMATION TRANSMISSION

[75] Inventors: Klaus Kuhlmann, Munich; Hermann Dibos, Remchingen; Albert Weiss, Munich; Klaus Kuhn, Germering, all of Fed. Rep. of Germany

[73] Assignee: Siemens Aktiengesellschaft, Munich

[21] Appl. No.: 374,654

[22] Filed: Jun. 30, 1989

[30] Foreign Application Priority Data

Jul. 14, 1988 [DE] Fed. Rep. of Germany ....... 3823913

[51] Int. Cl.$^5$ .............................. G06F 13/10
[52] U.S. Cl. .................. 364/200; 364/222.3; 364/280.2; 364/284.4
[58] Field of Search ... 364/200 MS File, 900 MS File; 379/93, 112

[56] References Cited

U.S. PATENT DOCUMENTS

| | | | |
|---|---|---|---|
| 4,253,157 | 2/1981 | Kirschner et al. | 364/900 |
| 4,578,751 | 3/1986 | Erwin | 379/93 X |
| 4,747,073 | 5/1988 | Desbois et al. | 364/900 |
| 4,791,661 | 12/1988 | Donaldson et al. | 379/93 X |
| 4,872,197 | 10/1989 | Pemmaraju | 379/93 |

Primary Examiner—Thomas M. Heckler
Attorney, Agent, or Firm—Hill, Van Santen, Steadman & Simpson

[57] ABSTRACT

A communications system with communications terminal equipment provided with prescribed functions that are defined and controlled by a communications installation by information transmission. An identical parameter-controlled program for all communications terminal equipment connectable to a communications installation is stored in the program memory of the communications terminal equipment. All functions that can be allocated to the different types of communications terminal equipment are realized by this program. The functions provided for the respective communications terminal equipment are allocated and controlled by parameter data stored in a data memory. On the basis of an initialization in the communications terminal equipment or in the communications installation, the parameter data are transmitted for the first time to or updated at the respective communications terminal equipment by the communications installation. In a communications system fashioned in this manner, the terminal-associated, flexible allocation of functions and procedures to the respective communications terminal equipment is preserved despite the displacement of switching-oriented and operations-oriented functions into the communications terminal equipment, which means a dynamic relieving of the central controller of the communications installation.

23 Claims, 4 Drawing Sheets

PAM

PSM

COMMUNICATIONS INSTALLATION WITH COMMUNICATIONS TERMINAL EQUIPMENT PROVIDED WITH PRESCRIBED FUNCTIONS DEFINED AND CONTROLLED BY A COMMUNICATIONS INSTALLATION WITH INFORMATION TRANSMISSION

BACKGROUND OF THE INVENTION

In communications installations and in communications terminal equipment connected thereto, required switching-oriented and operations-oriented functions are predominantly realized and coordinated by controllers of the communications installations. Required signalling information exchange and operating technology information exchange with the communications terminal equipment respectfully occurs via a signalling duplex channel with a message-oriented transmission procedure. The individual functions and suitable programs defining their interaction are stored in the program memories of the controllers. Variable information such as, for example, information about type, equipment features and performance features as well as terminal positions of the communications terminal equipment are inserted into the programs via parameters. The data belonging to the parameters are thereby separately stored for every communications terminal equipment in a region provided for this purpose in the data base usually established in a program-controlled communications installation. As a consequence of the central processing and administration and as a consequence of the parameter-controlled functions different functions can be allocated to a communications terminal equipment and can have modifications associated with the terminal equipment. The increasing demand for more user friendly and, thus, more complex performance features such as, for example, display of the telephone number of the calling communications terminal equipment at the called communications terminal equipment causes a considerable increase in the number of, in particular, switching functions and coordination functions in the communications installations and leads to a significant dynamic load on their controllers. Since the communications terminal equipment are being equipped with micro-processor systems or micro-computer systems to an increasing degree, some of the switching-oriented and operations-oriented functions are already realized in the communications terminal equipment.

It is also known that single systems or series systems, switching locations and operations-oriented consoles can be connected to a communications installation. Respectively different switching-oriented and operations-oriented functions are thereby allocated to the communications terminal equipment. In existing networks, these are rigidly allocated to every communications terminal equipment in the form of programs stored in their program memory and data appertaining thereto and representing the parameters that are stored in the data memory. A modification of this allocation is only possible with a physical change of program memory and/or the data appertaining thereto.

SUMMARY OF THE INVENTION

An object of the present invention is to provide a communications system such that the control of the communications installation contained therein is dynamically relieved despite additional performance features to be realized and such that the terminal-associated, flexible allocation of functions and procedures to the respective communications terminal equipment is preserved.

The present invention is a communications system having a program-controlled communications installation or switching apparatus to which a plurality of program-controlled communications terminal equipment fashioned as at least one of individual systems, series systems, switching location and operations-oriented operating apparatus can be connected and that communicate with the communications terminal equipment via a respective signalling duplex channel using a message-oriented transmission protocol for the purpose of a signalling-oriented and operations-oriented information exchange, whereby the functions allocated to the communications terminal equipment are realized by a program-controlled means for control located therein, having:

an identical program at least for all connectable communications terminal equipment of the same type for the realization of functions allocatable to the communications terminal equipment for the control of manual or acoustic means for input and optical or acoustic means for output, for the control of input-controlled, switching-oriented and operations-oriented procedures, and for the control of local performance features, the identical programs being stored in the program memories of the communications terminal equipment connectable to the communications installation;

functions and sub-functions provided for the respective communications terminal equipment being selected and being at least in part controlled by program parameters capable of influencing the program execution and allocated in prescribed fashion to a data memory; and a first-time transmission or updating of parameter data which supply the program parameters to the communications terminal equipment occurring with the assistance of the message-oriented transmission protocol on the basis of an initialization in the communications-terminal equipment or in the communications installation.

The essence of the present invention is that the same program is stored in the program memory at least for communications terminal equipment of the same type and the communications installation specifies the functions that are provided for the respective type of terminal equipment and for the respective configuration of the communications terminal equipment by transmitting corresponding data that represent the parameter, referred to below as parameter data. The realization of a single program, independently of the type of communications terminal equipment, for all communications terminal equipment connectable to the communications installation is especially advantageous. Since this program contains all functions that can be allocated to a communications terminal equipment, the greatest flexibility is achieved in the allocation of functions to the communications terminal equipment. In addition to the functions, the performance features and authorizations intended for the communications terminal equipment are defined by the parameter data transmitted from the communications installation. Further, the procedural control of the switching-oriented and operations-oriented functions for the various types of communications terminal equipment and the performance features allocated thereto are defined by the transmitted parameter data. The parameter data are thereby transmitted into a data memory of the communications terminal equipment by the communications installations with a special transmission procedure. These parameter data are administered by a process realized with a corresponding program that offers additional access procedures for accessing further processes provided in the communications terminal equipment. The functions allocated to a communications terminal equipment are realized by these further processes. The information exchange among the individual processes thereby occurs via an operating system having uniform interfaces. Only the process that represents the connecting link between the software components and hardware components of the communications terminal equipment is driven directly by those processes within whose execution hardware elements are to be selected.

The manual input means in the communications terminal equipment are preferably realized with key elements. The keys are subdivided into two key levels in the sense of a multiple utilization. This means that one key can exhibit two significances dependent on the level setting. The allocation of the significance of the keys, for example, return call key, in all key levels and the switching-oriented or operations-oriented procedure initiated by the key actuation is determined by the parameter data transmitted from the communications installation.

The microphone capsules and earphone capsules usually inserted in the handset represent acoustic input and output means. Over and above this, microphone and loudspeakers are additionally arranged in the communications terminal equipment for optional performance features such as, for example, "open listening", and "hands free talking". The authorization for their utilization by the respective subscriber is essentially determined by parameter data transmitted from the communications installation.

Optical output means in modern communications terminal equipment are predominantly realized by liquid crystal displays (LCD) or light-emitting diodes (LED). Different LCD displays are provided for the different types of communications terminal equipment such as individual equipment, series system equipment, exchange equipment and servicing and maintenance communications terminal equipment due to the different demands with respect to the display volume of information. For example, two lines of 24 characters each or eight lines of 40 characters each can be provided. Further, the plurality of virtual display levels are allocated to the LCD displays. This means that the display information are stored in a plurality of levels, usually priority levels, and the corresponding levels are displayed after appropriate control. The plurality of the display levels, the division into display fields within these levels and the character set employed that is dependent on the size of the LCD display are determined by the parameter data transmitted from the communications installation.

For utilization of a communications terminal equipment as operations-oriented terminal, the physical bit patterns allocated to the keys are directly transmitted to the communications installation from the communications terminal equipment after a key stimulus without further evaluation.

Either after a request from a communications terminal equipment or after an internal request in the communications installation, the parameter data are transmitted from the latter to the communications terminal equipment. In the communications terminal equipment, an initialization can be initiated after every re-synchronization of the signalling, after every change of the expansion of the communications terminal equipment or after every resetting of its control. Messages whose message format agrees with that already employed in the signalling channel are provided for this purpose. The message-oriented transmission procedure used in the signalling channel serves for the exchange of signalling-oriented information and operations-oriented information between the communications installation and the respective communications terminal equipment. As already explained, the initialization of a transmission of parameter data can proceed either from a communications terminal equipment or from the communications installation. Given an initialization by a communications terminal equipment, a parameter request message is formed therein and is transmitted to the communications installation. This parameter request message essentially contains those information that enable the identification of the respective communications terminal equipment in the communications installation. These identification information are composed of a configuration information of the communications terminal equipment and of a position information of the communications terminal equipment. The type of communications terminal equipment information is formed by an equipment size information and by an equipment expansion information. An equipment expansion information, for example, represents a prescribed key expansion and display expansion of a communications terminal equipment.

A start up parameter message is formed in the communications installation either after the reception of a parameter request message or of an internal request of the system and is transmitted to the respective communications terminal equipment. The address criteria and index information as well as sub-index information ar transmitted with the assistance of this start up parameter message. The address criteria contain information that define to which communications terminal equipment the start of parameter message and the following parameter messages are transmitted. Thus, the start of parameter message can be designationally transmitted to a single communications transmission equipment, to a specific group of communications terminal equipment of the same type and same equipment or to all communications terminal equipment.

The start of parameter message is designationally transmitted to a communications terminal equipment mainly when a parameter request message was received from a communications terminal equipment. The start of parameter message is transmitted to a group of communications terminal equipment when, for example, the parameter data for this group of communications terminal equipment were modified. A start of parameter message is transmitted to all communications terminal equipment, for example, for the purpose of an updating of time of day and calendar. The type and sub-types of parameters whose parameter data are subsequently transmitted are indicated by the index information as well as by the sub-index information. The parameter data respectively allocated to a start of parameter message are transmitted to the respective communications terminal equipment by parameter messages. Since the length of the parameter messages is usually limited for dependability reasons, larger quantities of parameter data are transmitted by a plurality of parameter messages. For checking the transmitted parameter data at the side of the communications terminal equipment, a length information, for example, is inserted into the start up parameter message for on the a basis whereof, for example, the number of bit or bytes of the parameter data to be transmitted relating to the start up parameter message is recited. Given incorrectly transmitted messages, an information indicating the faulty messages can be respectively transmitted from the recognizing means to the respectively other means.

For further protection of the parameter data allocated to a start up message, a message code information indicating the end of transmission is inserted into the start up parameter message. This protection measure effects that the end of transmission of parameter data allocated to a start up parameter message can also be unambiguously recognized when the protection information enabling the summary check were faultily transmitted.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
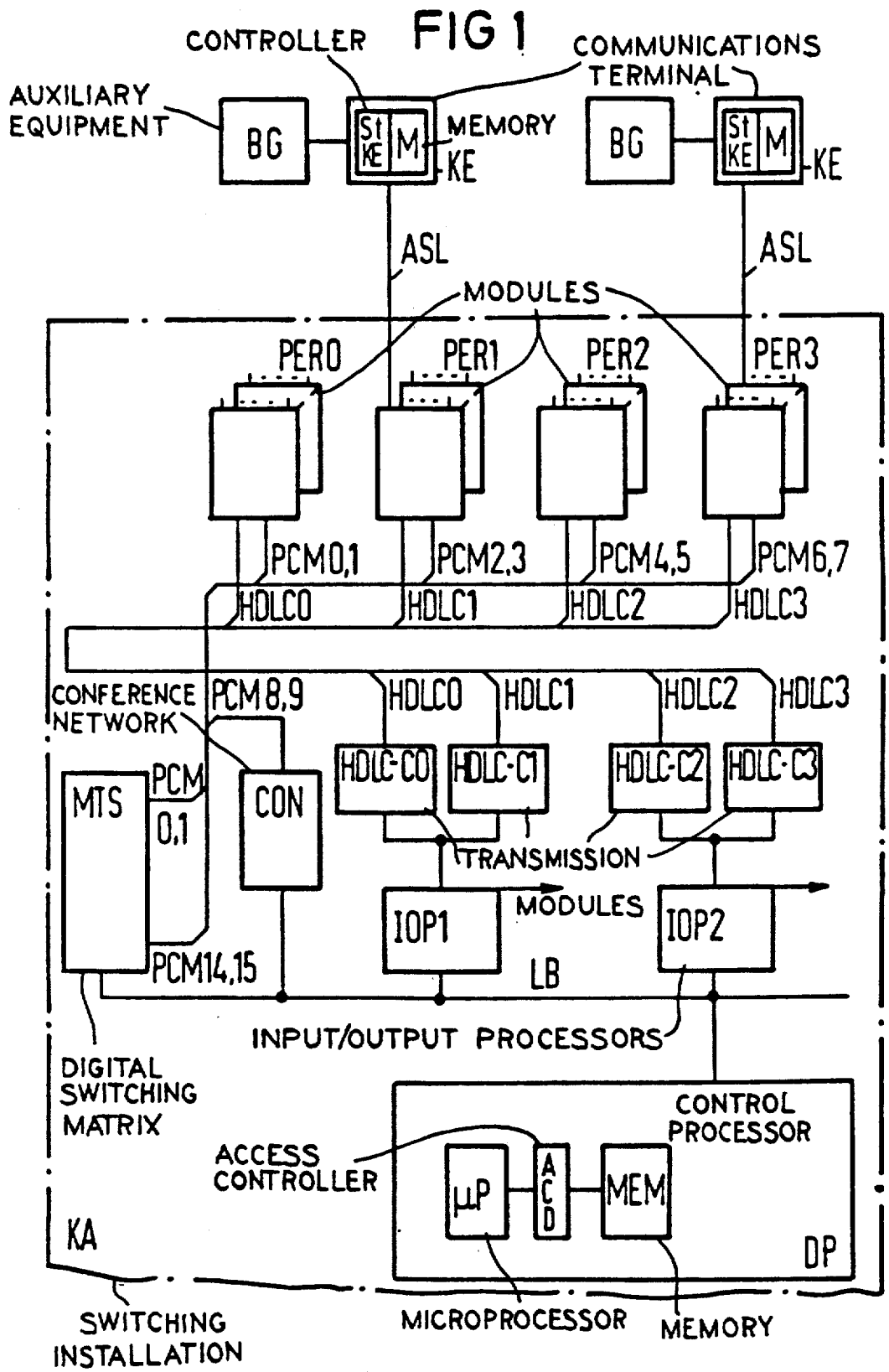
FIG. 1 is a block diagram of a communications installation including the connection region of the communications terminal equipment.

As an example, FIG. 1 shows a communications system underlying the method of the invention that is formed by a communications or, respectively, switching installation KA and by communications terminal equipment KE connected thereto. The communications installation KA is essentially subdivided into three hierarchic structure levels. The periphery level that essentially serves for the connection of terminal equipment and lines is formed by three periphery modules PER1, PER2, PER3 each of which is respectively formed of a plurality of subscriber connection modules or, respectively, line termination units such that a maximum of 64 ports, for example, 32 2-wire line terminations, are accessible at the periphery module PER1 . . . PER3.

The subscriber connection modules, for example, can serve for the connection of analog subscriber terminal equipment. They then usually comprise an interface means per terminal equipment having call indication and loop closure indication to which a processor means for analog-to-digital or, respectively, digital-to-analog conversion and for programmable input impedance or, respectively, level matching is respectively allocated. One possible realization of these components of a subscriber connection module may be derived from U.S. Pat. No. 4,381,561 (herein incorporated by reference). The interface between a maximum of 16 such line-associated equipment and internal communications installation PCM connections or, respectively, HDLC control lines (high level data link control) is formed by a module processor control whose structure and functioning, for example, can correspond to the processor disclosed in U.S. Pat. No. 4,694,452 (herein incorporated by reference). Further details of the function of this processor may be derived from the product publication of Siemens AG, PDC Peripheral Board Controller PEB 2050 (SM 205), Preliminary Technical Description (Part I), Ordering Number B/2684-101.

Other connector assemblies for, for example, digital or ISDN equipment or, respectively, trunk lines can be provided in each of the periphery modules PER1, PER2, PER3 either alone, additionally or in combination. Let it be assumed for the exemplary embodiment that it is predominantly digital or, respectively, ISDN-oriented communication terminal equipment KE that are provided. Digital communications terminal equipment KE are connected to these connector assemblies via mostly integrated transmission technology and digital central office lines ASL. These communications terminal equipment KE are respectively equipped with a controller ST-KE usually realized in micro-processor technology and with a memory M respectively subdivided into a program memory and data memory. In addition to individual user data, for example, telephone numbers, the program parameter data are also stored in the data memory realized, for example, as a non-volatile memory. Auxiliary equipment BG can be connected to the communications terminal equipment KE via a respectively suitable interface. For example, these can be telephone number memories or chip card readers. The control of the auxiliary equipment BG is usually assumed at least in part by the controller STKE of the communications terminal equipment.

The module processor controls essentially formed by module processor controllers and at least one microprocessor serving for the coordination thereof respectively administer two PCM-structured connections (PCM highways) PCM2, PCM3; PCM 4, PCM5; PCM6, PCM7 and a respective bidirectional connection for forwarding and accepting control information that are transmitted in the standardized transmission procedure HDLC. A further periphery module PER0 serves the purpose of supplying the communications system with call progress tones, announcements and music when connections are on hold. The additional periphery module PER0 also contains audible character receivers, transmission and reception equipment for selection signals transmission in dual tone multi-frequency signalling as well as test transmitters and test receivers. The additional periphery module PER0, similar to the periphery modules PER1, PER2, PER3, is connected via two PCM highways, PCM0, PCM1 as well as via an information transmission link HDLC0.

The next structure level of the digital communications system is formed by a total of four (control information) transmission modules HDLC-C0, HDLC-C1, HDLC-C2, HDLC-C3 (HDLC controllers) as well as by two input/output processors IOP1, IOP2, whereof the input/output processor IOP1 is allocated to the two transmission modules HDLC-0 and HDLC-C1 but the input/output processor IOP2, by contrast, is allocated to the transmission modules HDLC-C2, HDLC-C3.

Since the HDLC standard is used for the exchange of data, instructions and messages in many appertaining, practically realized systems, corresponding (control information) transmission modules are realized in the form of integrated circuit; the communications installation shown in FIG. 1 utilizes these modules (HDLC controllers) in the standard way, so that no hardware or software modifications are required for the utilization of these modules in the communications installation. The block check field is of special significance in the data transmission blocks defined in the HDLC standard within the framework of the communications system since a forwarding of control information secured against errors is possible with the block check character sequence transmitted in this field.

A digital switching matrix network module MTS to which all PCM highways, PCM0, PCM1 . . . PCM14, PCM15 are connected also belongs in the same structure level as the (control information) transmission modules HDLC-C0 . . . HDLC-C3. For example, the digital switching matrix network module is realized by the integrated circuit PEB 2040 of Siemens AG. The structure and functioning of a digital switching matrix network module are disclosed, for example, in U.S. Pat. No. 3,678,206 (herein incorporated by reference).

A conference network CON that is connected to the digital switching matrix network module MTS with two further PCM highways PCM8, PCM9 is also inserted into the structure level of the transmission modules HDLC-C0 . . . HDLC3 and of the digital switching matrix network module MTS. A possible realization of the conference networks CON is disclosed in U.S. Pat. No. 4,054,757 (herein incorporated by reference).

Like the two inputs/output processors IOP1, IOP2, the digital switching matrix network module MTS and the conference network CON are connected to a local multiplex bus LB that represents the interface to the hierarchically highest structure level of the digital communications installation. This structure level is formed by a central control processor DP that coordinates the interaction of all assemblies and modules of the communications installation. In addition to being equipped with clock-generating devices, the central control processor DP is equipped with a micro-processor $\mu p$, with a preceding access controller AC0 and with a memory MEM. The program parameter data PD for every communications terminal equipment KE are stored in this memory MEM in a memory region provided for this purpose. The critical functions of the central control processor are, thus, the storage and request-suited handling of switching-oriented programs and, facing toward the periphery, the control and monitoring of the local bus LB. Additional standard functions of the central control processor are operations-oriented handling, dependability-oriented displays as well as clock generations.

The method of the invention is provided for the transmission of program parameter data between the communications installation KA and the communications terminal equipment KE connected thereto, i.e. essentially between the communications terminal equipment KE and the periphery modules PER1 . . . PER3. As initially set forth, the fundamental structure of the message-oriented transmission procedure has already been proposed in the German patent application P 37 32 679.1. The internal functions in the communications installation and communications terminal equipment for further-handling of the messages of the transmission procedure employed are realized in the respective control equipment with the assistance of appropriate software. Since these functions are not required for explaining the method of the invention, they have not been set forth in detail.

Figure 2:
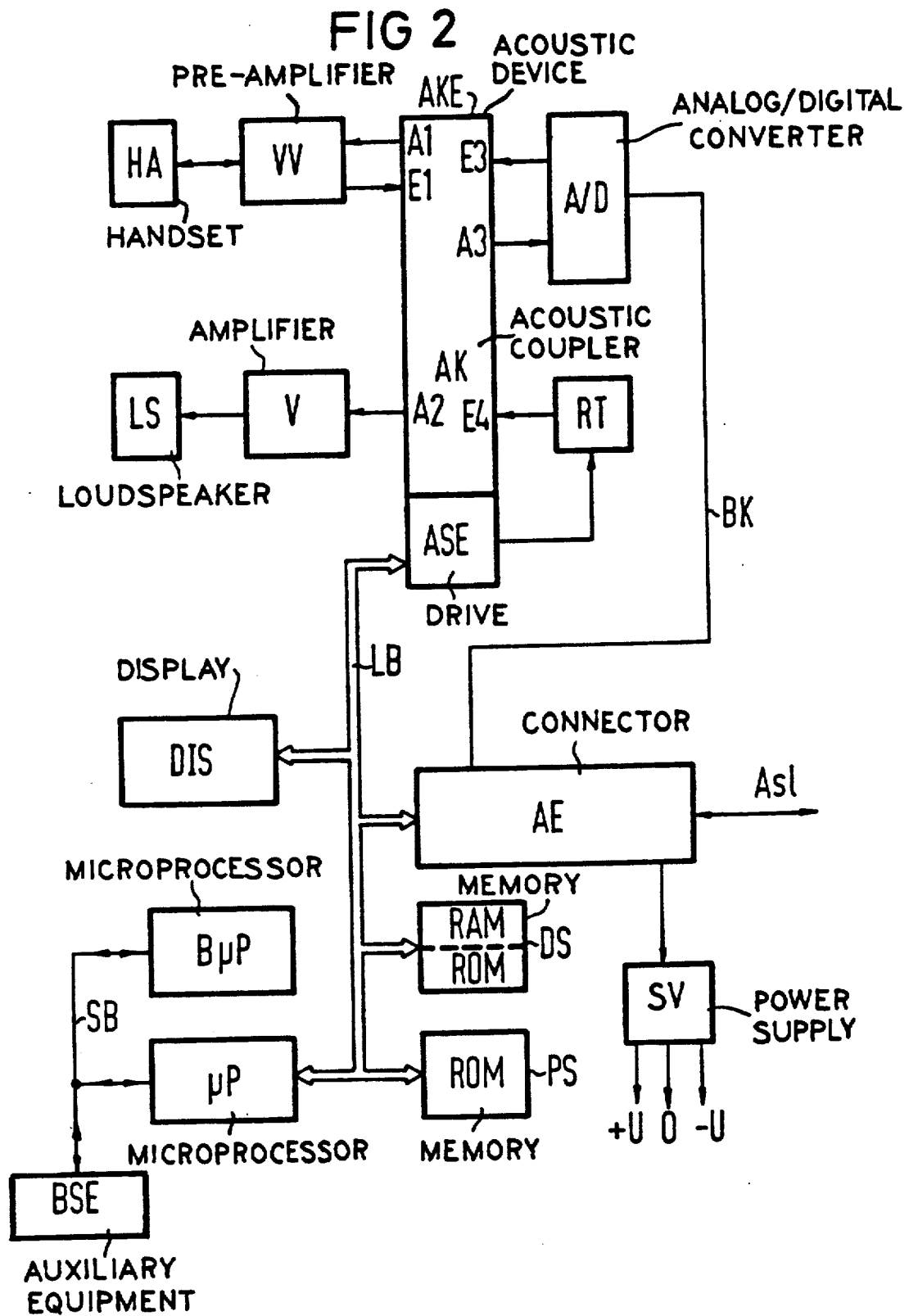
FIG. 2 is a block circuit diagram of the hardware components of a communications terminal equipment.

FIG. 2 shows a hardware block circuit diagram of a communications terminal equipment without hand-free means. The central equipment for controlling the subscriber user procedures, for controlling all acoustic signals to be transmitted in the communications terminal equipment and for controlling these signalling with the communications installation is realized by a microprocessor system $\mu p$. For example, this micro-processor system up can be formed by a Siemens micro-processor SAB 80 C 31. The micro-processor system $\mu p$ is connected to a program memory PS and to a data memory DS via a local bus LB formed of control, address and data lines. The program memory PS realized in ROM memory technology is designed, for example, for a program encompassing a maximum of 64k bytes. The data memory DS likewise encompassing, for example, 64k bytes can, for example, contain read-only memories executed in ROM memory technology in its one-half, for fixed data, parameter data and cables, and can contain memories executed in RAM memory technology in its other half, for example, for storing user-associated data. The micro-processor $\mu p$ additionally comprises a serial bus interface. This serial bus interface is connected to a control panel microprocessor system $B\mu p$ via the serial bus SB. The auxiliary equipment BSE connected to the communications equipment are also operated via this serial bus SB. The coded information generated by the operating elements are recognized in the control panel micro-processor system $B\mu p$, are serially transmitted to the micro-processor system $\mu p$ via the serial bus SB and are further-processed in the microprocessor system up into signalling information and into operator guidance information, for example, for light-emitting diodes, tones and displays in a display means.

Further, a display means DIS is connected to the local bus LB. For example, the display means DIS is realized by a LCD display (two lines of 24 characters each).

This LCD display is utilized for displaying numerals and plane text. Given employment of the communications trouble equipment as an exchange equipment, the display means DIS can be realized, for example, with a LCD display (eight lines of 40 characters each).

The communications terminal equipment is connected to a subscriber line as1 via a connector equipment AE. The communications terminal equipment communicates with a communications installation via this subscriber line as1. The message encompassing 64 kbit/s and the signalling information encompassing 8 kbit/s are bidirectionally communicated via the subscriber as1. The signalling information transmitted in the signalling channel are structured according to the OSI reference model. The lower three protocol layers of the seven abstracted protocol layers of the OSI reference model are realized. The protocol layers utilized for the signalling between the communications terminal equipment and communications installations are defined as bit transmission layer (layer 1), as dependability layer (layer 2) and as switching layer (layer 3). The bit transmission layer, also referred to as physical level, manages the transmitting of the information in the message and signalling channels in both directions simultaneously. The activation, deactivation and operation of the communications terminal equipment are thereby included. The dependability layer assumes the safeguarded transmitting of the signalling information between the communications installation and the communications terminal equipment for the adjoining transmission layer. For example, this can ensue with an HDLC transmission procedure or with a last-look procedure. What is to be understood by last-look procedure is a multiple transmission of the information that must be recognized as identical at least twice in succession in the receiving equipment and must also be different from the most recently received, valid signalling information in order to be recognized as being valid.

The transmission layer serves for the set-up, monitoring and clear-down of the communications connections as well as for the control and monitoring of the performance features supported by the communications installation. The connector equipment essentially realizes the functions of the bit transmission layer (layer 1) under the control of the microprocessor system $\mu p$. The following, essential functions are contained in the connector equipment AE:

transmission-oriented adaptation to the subscriber line as1;

transmitting the signalling and message information with signals formed according to a burst mode transmission method;

separating message information and signalling information and forwarding to the appropriate equipment; and out-coupling an electrical energy transmitted via the subscriber line as1 and offered by the communications installation and the forwarding thereof to an internal power supply SV of the communications terminal equipment.

For example, the connector equipment AE is realized with a LSI, customized circuit and with a plurality of layer circuits.

In the power supply SV, the electrical energy communicated from the connector equipment AE is converted into a positive and negative feed voltage $\pm U$ that is required for the operation of the communications terminal equipment. These power supplies SV are preferably realized by space-saving switch controller power supplies.

The signalling information separated in the connector equipment AE from the information transmitted via the subscriber line as1 are edited suitable for the local bus and are transmitted via the local bus LB to the microprocessor system $\mu p$. In the microprocessor system $\mu p$, these signalling information are further-processed according to the functions allocated to the dependability layer and the switching layer and the corresponding reactions, for example, selecting output units, are initiated. The message information separated in the connector equipment AE proceed to an analog-to-digital converter means AD. Analog voice signals are formed in the latter from the digitized message or, respectively, voice signals output from the connector equipment AE. The analog voice signals incoming at a further input of the analog-to-digital converter means A/D are converted into digital voice signals. The coding or, respectively, decoding of the analog or, respectively, digital voice signals ensues on the basis of the known, standardized PCM method. The analog voice signals proceed via a corresponding connection to a third input E3 of an acoustic means AKE. The acoustic means AKE is composed of an acoustic coupler AK and of a drive means ASE. The acoustic coupler AK switches the analog signals incoming from the analog-to-digital converter means A/D either only to a first output A1 or to the first and to a second output A1, A2. Output A1 is connected to the handset of the communications terminal equipment via a pre-amplifier VV. After the through-connection of the connection, the analog voice signals are conducted via the pre-amplifier VV in every instance to a receiver earpiece arranged in the handset HA. Analogous thereto, the voice signals output by a microphone arranged in the handset HA proceed via the pre-amplifier VV to a first input E1 of the acoustic coupler AK. The acoustic coupler AK switches the analog voice signals to a third output A3 connected to the analog-to-digital converter means A/D. These analog voice signals are converted into digital signals in the analog-to-digital converter means A/D and, in the connector equipment AE, are inserted into the message stream communicated to the subscriber line as1. When the performance feature "open listening" is activated in the communications terminal equipment by, for example, a corresponding key stimulus, then the analog voice signals incoming at the third input E3 are simultaneously conducted to a second output A2 of the acoustic coupler AK. From the latter, the analog voice signals proceed via an amplifier V to a loudspeaker LS arranged in the communications terminal equipment. The drive equipment ASE arranged in the acoustic means AKE is connected both to the acoustic coupler AK as well as to the local bus LB. In this drive equipment ASE, the control instructions communicated from the microprocessor system $\mu p$ via the local bus LB are converted into information with which the connecting paths in the acoustic coupler AK are set. For example, the acoustic coupler AK is realized by analog crosspoints executed in CMOS technology. In addition, the drive equipment ASE controls a call tone generator RT that, dependent on the drive, generates different call tones having corresponding call rhythms. These call tones are communicated to the handset HA and/or to the loudspeaker LS via the acoustic coupler AK under the control of the drive equipment ASE.

Figure 3:
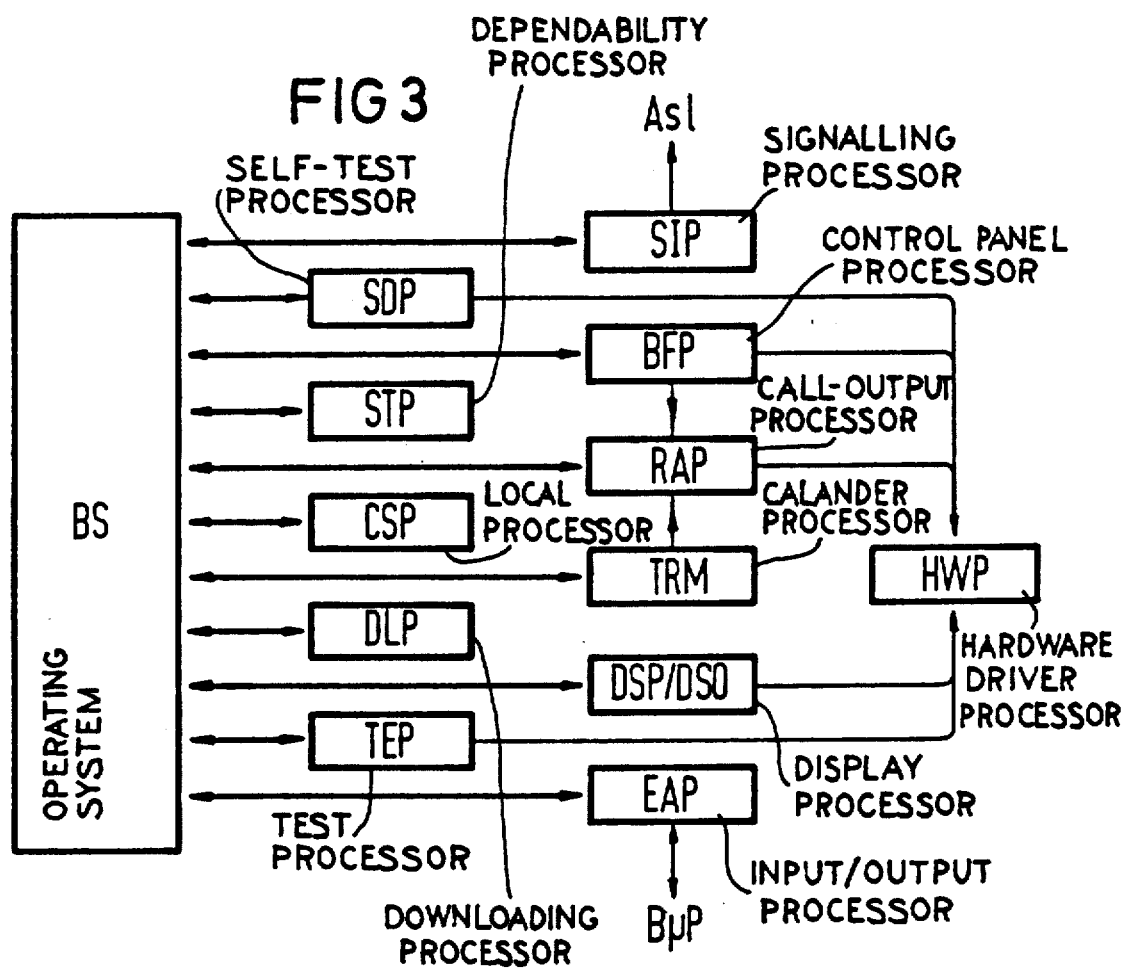
FIG. 3 is the process architecture of a communications terminal equipment realized according to FIG. 2, shown in a block circuit diagram.

FIG. 3 shows the process architecture of the microprocessor system $\mu p$. The information exchange or, respectively, data exchange between the individual processors fundamentally occurs via an operating system tailored to the microprocessor system $\mu p$ - with a few exceptions. Such an operating system, for example, represents the operating system COSMOS 51 provided the Siemens Microprocessor System 80 C 51. This operating system offers uniform organizational interfaces for the information exchange among the processors.

The following processors are realized in the microprocessor system $\mu p$:

control panel processor BFP;

the control panel processor administers the operating procedures defined in the terminal equipment and also administers the exchange-oriented procedures that are provided in the interaction with the communications installation. Only the operating procedures, initialized by key stimulus, that are known to the communications terminal equipment are administered. For example, such procedures or, respectively, functions are represented by;

the control of the call volume, the switching-oriented line handling, control of the acoustic means, etc., and Local Processor CSP.

All local and system-related operating procedures and storing functions, such as, for example, name keys, abbreviated dial codes, deadlines, etc., are realized by this process.

Display Processor DSP/DSO is divided into an administration processor and into an output processor DSP/DSO. Two different display quantities, see the explanations to FIG. 1, are controlled and administered with the assistance of this display processor. Which of the two display quantities is present in the communications terminal equipment and is to be controlled or, respectively, administered is determined by the parameter data transmitted from the communications installation. Among the jobs included in the display processor are:

the administration of a display data memory,
a priority control dependent on the display quantity, and
a formation of time of day and date (day, month) according to a basic setting prescribed by the communications installation by the transmission of parameter data and according to periodic synchronization by the communications installation.

In the call output processor RAP different call types are formed by the call output processor RAP and are transmitted to the requesting or, respectively following processes dependent on a call priority. The call rhythms are generated via time generators implemented in the call output processor RAP. The call natures, types and priorities provided for the respective communications terminal equipment are determined by the parameter data transmitted from the communications installation.

In the parameter data transmission processor DLP the parameter data transmission processor DLP (down loading processor) configures the user's surface of the communications terminal equipment as well as the performance features thereof. It automatically monitors its data domain and also executes error correction as warranted. The parameter data transmission processor DLP additionally makes a series of access procedures available for other processes while which the parameter data it administers can be interrogated. The parameter data can be requested by the communications installation and transmitted individually or block-by-block after an initialization in the communications terminal equipment.

In the dependability-oriented processor STP this secretly sequencing process controls the program watchdog, produces error protocols about acquired errors and successively checks every sub-microprocessor utilized in the communications terminal equipment.

In the signalling processor SIP this processor realizes the central data transmission interface between the communications installation and the communications terminal equipment. The reception and the sending of the signalling information are executed with the assistance of this signalling process. The individual, received signalling information are thereby evaluated in the lastlook method, see the description of FIG. 1. The recognized signalling information are converted into appropriate stimuli for forwarding to the processes to be selected. Analogous thereto, the stimuli or, respectively, information communicated from the remaining processes are converted into corresponding signalling information.

In the input/output processor EAP this input/output processor EAP realizes the interface to the sub-microprocessors (for example, control panel microprocessor) via the serial bus SB. With the assistance of this input/output processor EAP, the physical data transmitted from the sub-microprocessors are converted into logical information for the selection of the remaining processes. Analogously, thereto, the logical information transmitted from the other processes are converted into physical information for the selection of the sub-microprocessors.

In the test processor TEP the test processor TEP essentially serves test purposes during the development phase and during a later maintenance of the communication terminal equipment. This test processor edits information for a communications terminal equipment tester and communicates them to it. The internal data accesses of the communications terminal equipment thereby ensue via access procedures present in the other processes.

In the hardware driver processor HWP the hardware driver processor HWP represents the connecting link between the program-controlled processes and the hardware elements of the communications terminal equipment. It has the driver routines required for the control of the hardware elements available to it. For example, the following events are controlled by the hardware driver process HWP:

switching the handset on and off;
controlling the call;
switching the voice channel on and off;
switching the loudspeaker amplifier on and off, etc.

The hardware driver processor HWP is the only one that does not communicate with the remaining processes via the operating system BS. The control information proceed to or come directly from the processes in whose execution the control of a hardware element allocated to the hardware driver processor HWP is provided. This measure is meaningful since no different process executions occur in a selection of a hardware element and vice versa.

In the self-test processor SDP a self-test of the communications terminal equipment is initiated and ended by the communications installation. The results of the self-test process SDP are acoustically and optically displayed and are communicated to the communications installation. Belonging to the self-test functions are:

a light-emitting diode test;
a key monitoring;
a tone test;
a display of the error memory contents;
a test of the hardware components, etc.; and
a calendar processor TRM.

A date or deadline calendar for, for example, 15 entries is administered in this calendar processor TRM. The individual dates are thereby automatically arranged in chronological order and monitored. The deadline expiration is acoustically reported with, for example, a reminder call or is reported with an optical display. It can also be indicated via a light-emitting diode whether deadlines are sequencing.

The individual protocol messages are shown and the possible informational contents of these messages are indicated below with references to FIGS. 4-6.

Figure 4:
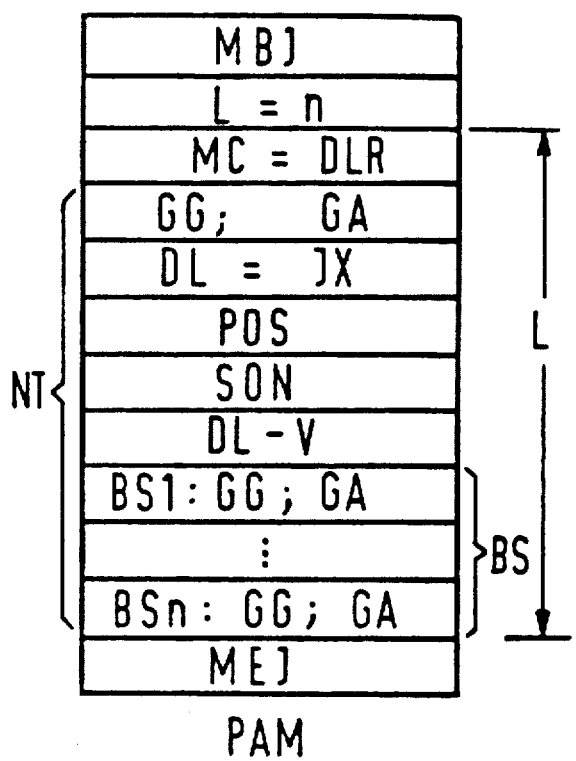
FIG. 4 is a diagram of the structure of a parameter request message.

Thus, FIG. 4 shows a parameter request message PAM that is formed in the communications terminal equipment KE and transmitted to the communications installation KA after every re-synchronization of the signalling; after every change of the expansion of the communications terminal equipment; and after every resetting of the program control.

Every message, even those set forth later, is provided with a start of message and an end of message information MBI, MEI. These start up message or, respectively, end of message information MBI, MEI can be formed, for example, by a one byte start of message character (for example, corresponding to the HDLC transmission procedure) or by a two-byte information (see the aforementioned German patent application P 37 32 679.1). Let it be assumed for the exemplary embodiment that the start-up message and end of message information MBI, MEI is formed by a two-byte information. The bit combination of the first byte is thereby defined such that this does not collide with the coded information of a following information part of the parameter request message PAM that are employed. What this first byte indicates, accordingly, is that a character is involved that is defined outside of the character scope of the coded information employed. The nature of the character is defined with the second byte. Thus, a bit combination in hexadecimal notation EF can be allocated to the first byte, for example, referred to as transport character. The bit combination "hexadecimal 01" can be allocated to the second byte, for example, for the start of message information MBI, and the bit combination "hexadecimal 02" can be allocated thereto for the end of message information MEI. This bit combination can coincide with that bit combination that indicates the message-free (idle) condition in the signalling channel. A length of message information L that, for example, encompasses one byte is attached to the start of message information MBI. This length of message information L indicates the plurality n of bytes that a following information part MT contains. The message code information MC defines the type of protocol message to be transmitted. Since a parameter request message PAM is to be defined, a corresponding, coded message code information MC-DLR, for example hexadecimal 51-H is entered. The type of communications terminal equipment is specified by the following information that, for example, encompasses two bytes. This type of communications terminal equipment information is composed of an equipment size information and of an equipment expansion information GG, GA. The equipment size information GD specifies whether, for example, a single telephone, a team telephone, an exchange location or an operations-oriented console is involved. The equipment expansion information GA indicates the expansion of the communications terminal equipment KE with respect to the size of the keyboard, size of the displays and further operating elements. The index information IX that, for example, encompasses one byte that is transmitted following the type of communications terminal equipment information indicates what type of program parameter data P are to be transmitted from the communications installation KA to the communications terminal equipment KE. For example, the index information IX listed below are thus possible:

key occupation information for different communications terminal equipment types and expansion levels;
acoustic call outputs;
types of call;
control of the displays in the communications terminal equipment;
time of day;
fixed texts;
performance features;
line functions;
message formats;
transmission of program parameter data is not desired; and
program parameter data P not yet received from the communications installation KA.

The position information POS for the communications terminal equipment that again encompasses one byte is attached to the index information IX. For example, this position information POS can be formed by a logical device number or by a terminal position information. For example, the terminal position information can be indicated by a logical or physical port number of the communications installation.

The position information POS is followed by a special equipment information SON. This special equipment information SON that encompasses one byte can, for example, be organized in bit-oriented fashion. For example, the information contents of the individual bits can thus define whether, for example, "open hearing", "hands free talking", etc., is realized in the communications terminal equipment KE. They subsequently transmitted information DL-V that likewise encompasses one byte indicates to the communications installation KA what degree of updating the program parameter data P stored in the communications terminal equipment KE have. With the assistance of this information DL-V, a determination can be made in the communications installation KA whether the program parameter data P stored in the communications terminal equipment KE still correspond to the current status. An auxiliary equipment information BS that, for example, encompasses three bytes is attached to this information DL-V that indicates the status of the program parameter data P. The presence, the type and the level of expansion of auxiliary equipment is identified by this auxiliary equipment information BS. For example, an auxiliary equipment is thereby defined by an auxiliary equipment information BS encompassing one byte that is composed of type and expansion information GG, GA. When no auxiliary equipment information BS are entered in the parameter request message PAM, then no auxiliary equipment is connected to the respective communications terminal equipment KE. The type of auxiliary equipment, for example, telephone number storing means or card reader, is defined by the type information GG. The level of expansion of the respective communications terminal equipment, for example the plurality of keys of a telephone number store, is indicated by an expansion information GA.

Figure 5:
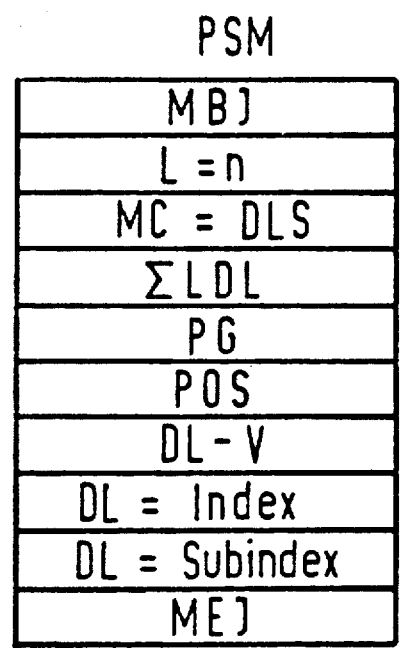
FIG. 5 is a diagram of the structure of a start up parameter message.

FIG. 5 shows the fundamental structure of a start of parameter message PSM. A start of parameter message PSM is generated in the communications installation KA either after reception and evaluation of a parameter request message PAM or of an internal parameter transmission request of the communications installation and is transmitted to the communications terminal equipment KE. The start of message and end of message information MBI, MEI is thereby formed in accordance with the message shown in FIG. 2. A message is specified as a start of parameter message PSM by a prescribed, coded, for example, hexadecimally 2 BH, message code information MC-DLS. A protection information LDA is attached to the message code information MC. The sum of the bytes that are subsequently transmitted to the start of parameter message PSM is indicated, for example, in this protection information LDA. Following this protection information LDL, a type of communications terminal equipment information GG, GA that encompasses one byte is transmitted. As already set forth, this type of communications terminal equipment is formed by an equipment size and by an equipment expansion information GG, GA. Alternatively, as already set forth in the introduction to the specification, a broadcast or position validity information PG can be inserted. Let it be assumed for the exemplary embodiment that the start of parameter message PSM is to be designationally transmitted to a communications terminal equipment KE. A type of communications terminal equipment GG, GA is thus formed by a position validity information PG. The entry of the position validity information PG effects that this start of parameter message PSM is transmitted to the communications terminal equipment KE specified by a following position information POS. This position information POS that again encompasses one byte can, for example, again be indicated by a logical device number or by a terminal position information. An information DL-V encompassing one byte that indicates the version, i.e. the state of the updating of the program parameter data p subsequently transmitted can be attached to the position information POS. The following index and sub-index information, IX, SIX that each encompass one byte specified in detail what program parameter data P are being transmitted following this start of parameter message PSM. For example, the index information IX are formed by the coded information explained in FIG. 1. When necessary, the sub-index information SIX indicate the allocation of the program parameter data P in detail. For example, a physical key number information is thus entered as sub-index information SIX when, for example, it is specified in the index information IX that the program parameter data P to be transmitted contain the key occupation of a telephone. This start of parameter message PSM is designationally transmitted from the communications installation KA to the communications terminal equipment KE specified by the position information POS. After reception and evaluation of the start of parameter message PSM, the terminal equipment in this communications terminal equipment KE is prepared for the reception of the program parameter data P subsequently transmitted from the communications installation KA. These program parameter data P are transmitted from the communications installation KA to the communications terminal equipment KE with the assistance of a parameter message PM.

Figure 6:
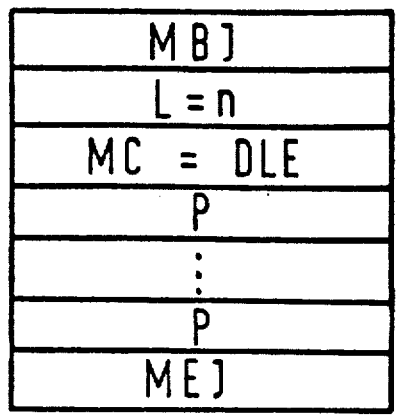
FIG. 6 is a diagram of the structure of a parameter message.

FIG. 6 shows the fundamental structure of a parameter message PM. Start of message information, end of message information and length information MBI, MEI, L are again formed in accord with FIG. 1. A message is defined as a parameter message PM by a prescribed, coded, for example, hexadecimally 2 BH, message code information DLE. The program parameter data P are transmitted following the message code information DLE. Usually, the plurality of bits or, respectively, bytes per parameter message PM is limited to a prescribed plurality, for example, 128 bytes. When the quantity of program parameter data exceeds the maximum message length of a parameter message PM, these are transmitted with a plurality of parameter messages PM. The parameter data P are received in the communications terminal equipment KE and are stored in the respectively allocated memory regions of the memory M of the communications terminal equipment KE in accord with the index and sub-index information IX, SIX transmitted in the start of parameter message PSM.

A reference to the term "processor" in the above description also is equivalent to the term "process" which refers to actual execution of a function.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communications system having a program-controlled communications installation or switching apparatus to which a plurality of program-controlled communications terminal equipment fashioned as at least one of individual systems, series systems, switching location and operations-oriented operating apparatus can be connected and that communicate with the communications terminal equipment via a respective signalling duplex channel using a message-oriented transmission protocol for the purpose of a signalling-oriented and operations-oriented information exchange, whereby the functions allocated to the communications terminal equipment are realized by a program-controlled means for control located therein, comprising:

an identical program at least for all connectable communications terminal equipment of the same type for the realization of functions allocatable to the communications terminal equipment for the control of manual or acoustic means for input and optical or acoustic means for output, for the control of input-controlled, switching-oriented and operations-oriented procedures, and for the control of local performance features, the identical programs being stored in the program memories of the communications terminal equipment connectable to the communications installation;

functions and sub-functions provided for the respective communications terminal equipment being selected and being at least in part controlled by program parameters capable of influencing the program execution and allocated in prescribed fashion to a data memory; and a first-time transmission o updating of parameter data which supply the program parameters to the communications terminal equipment occurring with the assistance of the message-oriented transmission protocol on the basis of an initialization in the communications-terminal equipment or in the communications installation.

2. The communications system according to claim 1, wherein a parameter request message is formed in the communications terminal equipment and is transmitted to the communications installation after every re-synchronization of the signalling, after every modification of the expansion of the communications terminal equipment, and after every resetting of the program controller;

wherein a start up parameter message containing the address criteria and index information as well as sub-index information is formed in the communications installation after the reception of a parameter request message or of an internal initialization and is transmitted to a communications terminal equipment, to a group of communications terminal equipment or to all communications terminal equipment; and wherein subsequently, at least one parameter message containing the data is formed in the communications installation and is transmitted to one communications terminal equipment, to a group of communications terminal equipment or to all communications terminal equipment.

3. The communications system according to claim 2, wherein the parameter request message, the start up parameter message and the parameter message are defined by a start up message information; an information allowing the summary check of the transmitted information; a message code information defining the message type; an information part that contains the identification information in a parameter request message, the address criteria and index information as well as sub-index information in a start up parameter message, and the data representing the parameter in a parameter message; and an end of message information.

4. The communications system according to claim 3, wherein the identification information is defined by a type of communications equipment information formed of equipment size and equipment expansion information, a configuration information of the communications terminal equipment formed of special equipment and auxiliary information, and a position information formed of device number information or terminal position information; and wherein the address criteria are defined by an equipment size information together with an equipment expansion information or by a broadcast information or by a position validity information.

5. The communications system according to claim 2, wherein an information enabling the summary checking of the transmitted parameter data can be inserted into the start up parameter message.

6. The communications system according to claim 2, wherein the last parameter message allocated to a start up parameter message can be defined by a prescribed message code information that indicates the end of transmission.

7. The communications system according to claim 1, wherein the manual means for input are key elements, and key levels and functional key occupation of the key elements are defined by the parameters.

8. The communications system according to claim 7, wherein different switching-oriented procedures are allocated by a stimulus of a key element and by the parameter data whose allocation is indicated.

9. The communications system according to claim 7, wherein for a means for service or maintenance, an operations-oriented procedure being allocated that directly transmits all stimuli of key elements.

10. The communications system according to claim 1, wherein the program for the realization of the functions associated with the communications terminal equipment is respectively subdivided into;
   a process that effects operating procedures determined in the terminal equipment,
   a process effecting all local operating procedures,
   a process administering display information,
   a process effecting the call output,
   a process administering data representing the parameters and controlling access procedures,
   a process controlling dependability in the communications terminal equipment,
   a process effecting or controlling signalling,
   a process effecting the input and output procedures for a processor that controls a control panel,
   a process supporting a communications system test,
   a process effecting a connecting link between software and hardware,
   a process effecting a communications terminal equipment self-test, and
   a process effecting a data calendar including means for optical and acoustic control;
   the information exchange between the processes occurring via an operating system containing uniform interfaces; and
   the process effecting the connecting link between software and hardware directly communicating with the processes in whose process execution a control of hardware is provided.

11. The communications system according to claim 1, wherein the acoustic means for input and output are microphones, earphones capsules or loudspeakers arranged in a handset or in the communications terminal equipment and their presence or the authorization for their use is determined by the parameter data.

12. The communications system according to claim 1, wherein the means for optical output are different liquid crystal displays (LCD) and light-emitting diodes (LED) and the character set employed, the plurality of virtual display levels and the division within these display levels are determined by the parameter data.

13. A communications system having a program-controlled communications installation or switching apparatus to which a plurality of program-controlled communications terminal equipment fashioned as at least one of individual systems, series systems, switching location and operations-oriented operating apparatus can be connected and that communicate with the communications terminal equipment via a respective signalling duplex channel using a message-oriented transmission protocol for the purpose of a signalling-oriented and operations-oriented information exchange, whereby the functions allocated to the communications terminal equipment are realized by a program-controlled means for control located therein, having:
   an identical program at least for all connectable communications terminal equipment of the same type for the realization of functions allocatable to the communications terminal equipment for the control of manual or acoustic means for input and optical or acoustic means for output, for the control of input-controlled, switching-oriented and operations-oriented procedures, and for the control of local performance features, the identical programs being stored in the program memories of the communications terminal equipment connectable to the communications installation;
   functions and sub-functions provided for the respective communications terminal equipment being selected and being at least in part controlled by program parameters capable of influencing the program execution and allocated in prescribed fashion to a data memory; and
   a first-time transmission or updating of parameter data which supply the program parameters to the communications terminal equipment occurring with the assistance of the message-oriented transmission protocol on the basis of an initialization in the communications-terminal equipment or in the communications installation; and
   the identical program for the realization of the functions associated with the communications terminal equipment subdivided into;

a process that effects operating procedures determined in the terminal equipment,
a process effecting all local operating procedures,
a process administering display information,
a process effecting the call output,
a process administering data representing the parameters and controlling access procedures,
a process controlling dependability in the communications terminal equipment,
a process effecting or controlling signalling,
a process effecting the input and output procedures for a processor that controls a control panel,
a process supporting a communications system test,
a process effecting a connecting link between software and hardware,
a process effecting a communications terminal equipment self-test, and
a process effecting a date calendar including means for optical and acoustic control;
the information exchange between the processes occurring via an operating system containing uniform interfaces; and
the process effecting the connecting link between software and hardware directly communicating with the processes in whose process execution a control of hardware is provided.

14. The communications system according to claim 13, wherein the manual means for input are key elements, and key levels and functional key occupation of the key elements are defined by the parameters.

15. The communications system according to claim 14, wherein different switching-oriented procedures are allocated by a stimulus of a key element and by the parameter data whose allocation is indicated.

16. The communications system according to claim 14, wherein for a means for service or maintenance, an operations-oriented procedure being allocated that directly transmits all stimuli of key elements.

17. The communications system according to claim 13, wherein the acoustic means for input and output are microphones, earphones capsules or loudspeakers arranged in a handset or in the communications terminal equipment and their presence or the authorization for their use is determined by the parameter data.

18. The communications system according to claim 13, wherein the means for optical output are different liquid crystal displays (LCD) and light-emitting diodes (LED) and the character set employed, the plurality of virtual display levels and the division within these display levels are determined by the parameter data.

19. A communications system having a program-controlled communications installation or switching apparatus to which a plurality of program-controlled communications terminal equipment fashioned as at least one of individual systems, series systems, switching location and operations-oriented operating apparatus can be connected and that communicate with the communications terminal equipment via a respective signalling duplex channel using a message-oriented transmission protocol for the purpose of a signalling-oriented and operations-oriented information exchange, whereby the functions allocated to the communications terminal equipment are realized by a program-controlled means for control located therein, having:

an identical program at least for all connectable communications terminal equipment of the same type for the realization of functions allocatable to the communications terminal equipment for the control of manual or acoustic means for input and optical or acoustic means for output, for the control of input-controlled, switching-oriented and operations-oriented procedures, and for the control of local performance features, the identical programs being stored in the program memories of the communications terminal equipment connectable to the communications installation;

functions and sub-functions provided for the respective communications terminal equipment being selected and being at least in part controlled by program parameters capable of influencing the program execution and allocated in prescribed fashion to a data memory; and a first-time transmission or updating of parameter data which supply the program parameters to the communications terminal equipment occurring with the assistance of the message-oriented transmission protocol on the basis of an initialization in the communications-terminal equipment or in the communications installation; and a parameter request message formed in the communications terminal equipment and transmitted to the communications installation after every re-synchronization of the signalling, after every modification of the expansion of the communications terminal equipment, and after every resetting of the program controller;

a start up parameter message containing the address criteria and index information as well as sub-index information formed in the communications installation after the reception of a parameter request message or of an internal initialization and transmitted to a communications terminal equipment, to a group of communications terminal equipment or to all communications terminal equipment; and subsequently, at least one parameter message containing the data formed in the communications installation and transmitted to one communications terminal equipment, to a group of communications terminal equipment or to all communications terminal equipment.

20. The communications system according to claim 19, wherein the parameter request message, the start up parameter message and the parameter message are defined by a start up message information; an information allowing the summary check of the transmitted information; a message code information defining the message type; an information part that contains the identification information in a parameter request message, the address criteria and index information as well as sub-index information in a start up parameter message, and the data representing the parameter in a parameter message; and an end of message information.

21. The communications system according to claim 20, wherein the identification information is defined by a type of communications equipment information formed of equipment size and equipment expansion information, a configuration information of the communications terminal equipment formed of special equipment and auxiliary information, and a position information formed of device number information or terminal position information; and wherein the address criteria are defined by an equipment size information together with an equipment expansion information or by a broadcast information or by a position validity information.

22. The communications system according to claim 19, wherein an information enabling the summary checking of the transmitted parameter data can be inserted into the start up parameter message.

23. The communications system according to claim 19, wherein the last parameter message allocated to a start up parameter message can be defined by a prescribed message code information that indicates the end of transmission.

* * * * *